United States Patent [19]

Ettema

[11] 4,108,480
[45] Aug. 22, 1978

[54] BRANCH PIECE FOR PROVIDING BRANCH CONNECTIONS IN A PIPE

[75] Inventor: Ernst Ettema, Hardenberg, Netherlands

[73] Assignee: Wavin B.V., Zwolle, Netherlands

[21] Appl. No.: 693,331

[22] Filed: Jun. 7, 1976

Related U.S. Application Data

[63] Continuation of Ser. No. 486,604, Jul. 8, 1974, abandoned.

[51] Int. Cl.² ............................................. F16L 41/00
[52] U.S. Cl. ...................................... 285/197; 285/421
[58] Field of Search ............... 285/197, 198, 199, 419, 285/421, 373, 427

[56] References Cited

U.S. PATENT DOCUMENTS

| | | |
|---|---|---|
| 1,563,406 | 12/1925 | Skinner ................................. 285/197 |
| 2,526,200 | 10/1950 | Corey .................................... 285/197 |
| 3,186,744 | 6/1965 | Smith et al. ...................... 285/421 X |

*Primary Examiner*—Werner H. Schroeder
*Assistant Examiner*—Moshe I. Cohen
*Attorney, Agent, or Firm*—Irving M. Weiner

[57] ABSTRACT

A branch piece for pipe branch connections comprising two parts. The first part is provided with two longitudinal edges extending parallel to the axis of the branch pipe, and the other part is provided with one longitudinal edge which can be coupled with one of the longitudinal edges of the first part. The second longitudinal edge of the other part tapered. A separate wedgelike connecting member has two lips each adapted to engage with a longitudinal edge of the first part and of the second part.

1 Claim, 3 Drawing Figures

BRANCH PIECE FOR PROVIDING BRANCH CONNECTIONS IN A PIPE

This is a continuation of application Ser. No. 486,604 filed July 8, 1974, now abandoned.

The present invention relates to a branch piece, for providing branch connections in a pipe, comprising a first part with a branch connection opening in a wall surface and a second part which, together with the first part, are adapted to surround the pipe, the two parts being connected together.

BACKGROUND OF THE INVENTION

Branch pieces for providing branch connections in a pipe are known in which the first and second parts are interconnected by two wedge-shaped members which engage with corresponding formations on the two parts on either side of the pipe. However, the operation of mounting the two wedge-shaped members on the two parts presents certain difficulties. After the first and second parts are disposed on the pipe and held fast, one of the wedge-shaped members is applied, and then it is first necessary to ensure that the two parts are properly aligned opposite each other before the second wedge-shaped member is applied.

It is known to overcome this difficulty by hingedly connecting the two parts of a branch piece together; but this form of construction is more expensive to manufacture. Furthermore, a hole of considerable size is required at the location of the branch connection, in order that after the first part is disposed on the pipe the second part can be pivoted around the pipe into position.

SUMMARY OF THE INVENTION

The present invention provides a branch piece of the afore mentioned type having a first part that can be disposed in an arbitrary position on the main pipe in which the branch connection is to be provided, whereupon the second part can be simply connected with the first part.

According to the present invention, there is provided a branch piece for providing connections in a pipe, comprising a first part provided with a branch connection opening, and a second part. Both of said parts have a cylindrical shape in a portion thereof corresponding to the pipe, and have connecting means on each side for connecting said parts together when fitted over the pipe. The connecting means on one side comprises a longitudinally extending external coupling edge on one part adapted to engage with a correspondingly formed lip on the other part. The connecting means on the other side comprises an external coupling edge on each part and a separate connecting member having two correspondingly formed lips each adapted to engage with a respective coupling edge.

Preferably, the external coupling edges of the connecting means on said other side are inclined at an angle relative to one another, and the lips of the connecting member are correspondingly inclined.

Preferably also, the first part is provided with a pair of external coupling edges each extending parallel to the longitudinal axis of the branch pipe, said edges constituting part of said coupling means on each side. Moreover, the two coupling edges of the first part may be identically formed such that the first part may be equally connected to the second part when either of said parts is rotated through 180°.

After the coupling edge of the first part has been coupled to the lip of the second part, the coupling ledge on the second part is situated opposite the other coupling edge on the first part, so that the connecting member can be slid over the still free coupling edge of the first part and the coupling ledge opposite thereto, to obtain the connection between the first and second parts of the branch piece.

Preferably, the inner circumference of the first part of the branch piece is more than 180°, so that the first part of the branch piece partially encompasses the pipe and stays thereon in any position. This can be effected, for example, by clamping.

Suitable materials for such branch pieces are polybutene, polyvinyl chloride, polyethylene or the like, which may be reinforced with glass fibers.

DESCRIPTION OF A PREFERRED EMBODIMENT

Figure 1:
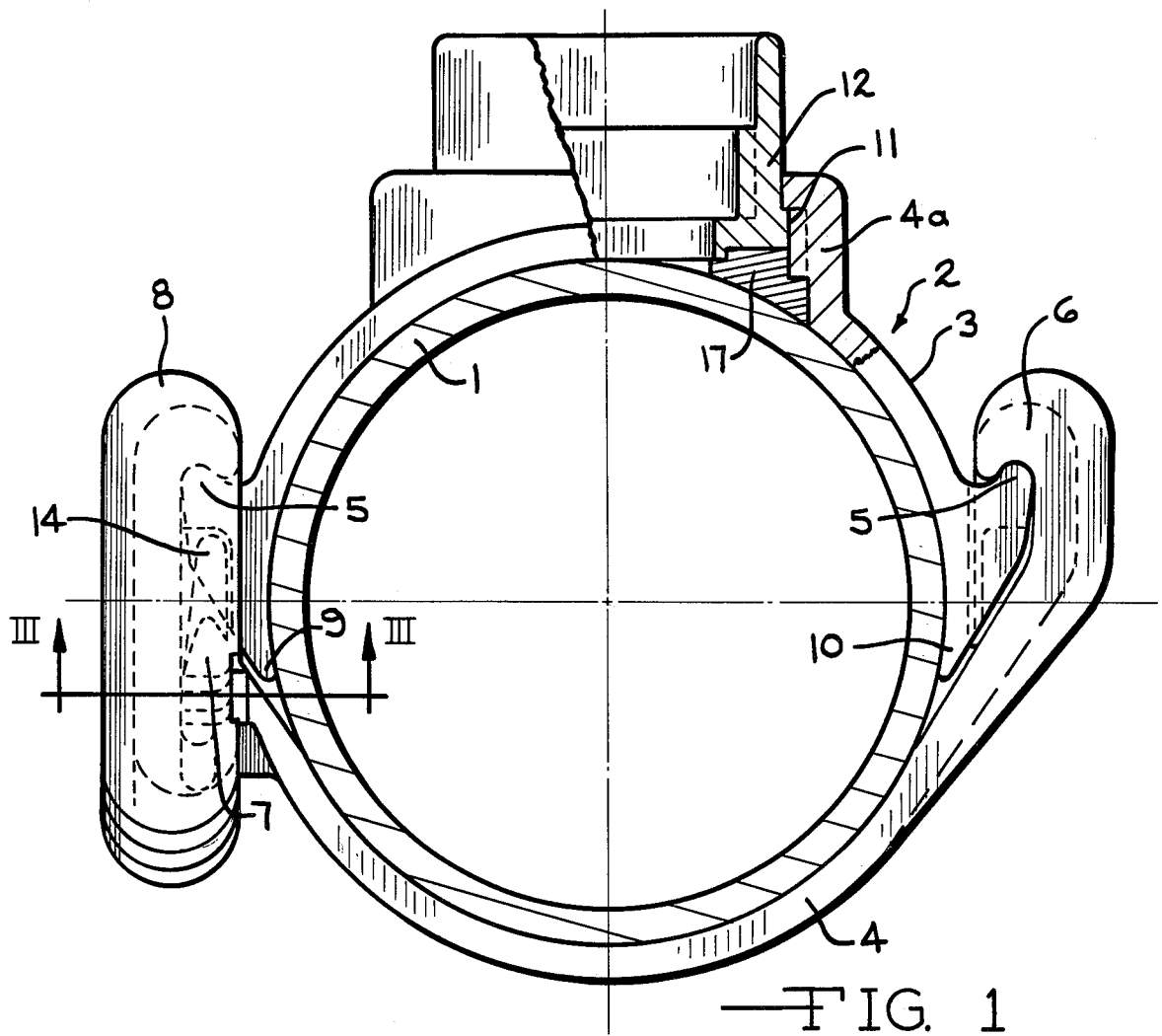
FIG. 1 is a cross-section through a branch piece mounted on a pipe.

FIG. 1 shows a pipe or pipeline 1 carrying a branch piece 2 having a first part or upper saddle member 3 provided with a branch connection 4a, and a second part or lower saddle member 4. The upper saddle member 3 is provided on both sides with coupling edges or ears 5 which are symmetrically disposed about the main axis of the upper saddle member and extending parallel to each other to the main or longitudinal axis of member 3.

The lower saddle member 4 is provided on one side with an archlike coupling edge 6 which is engageable with a coupling edge 5. On the other side, the lower saddle member 4 carries a longitudinally extending inclined ledge 7 extending obliquely in the longitudinal direction. A wedge-shaped connecting member 8, provided with relatively inclined inner formations for engagement with at least a portion of the obliquely extending ledge 7 of the lower member 4 and with at least a portion of a coupling edge 5 of the upper member 3, is used to connect the members 3 and 4 together.

Figure 3:
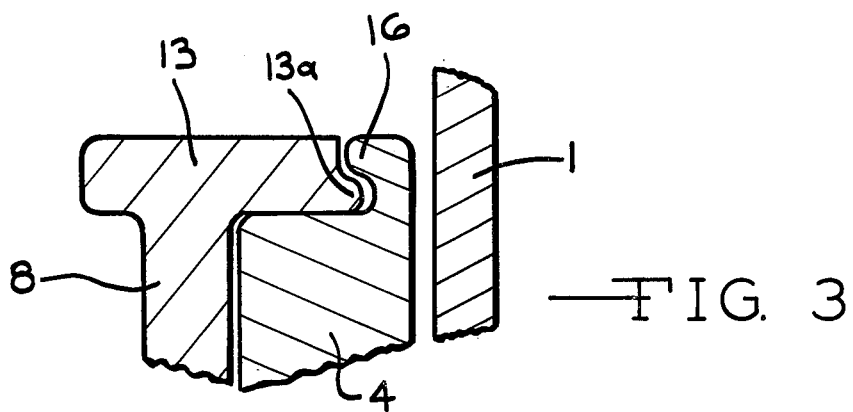
FIG. 3 is a sectional view of a detail taken along the line III—III of FIG. 1 of a connecting member and the second part of the branch piece.
Figure 2:
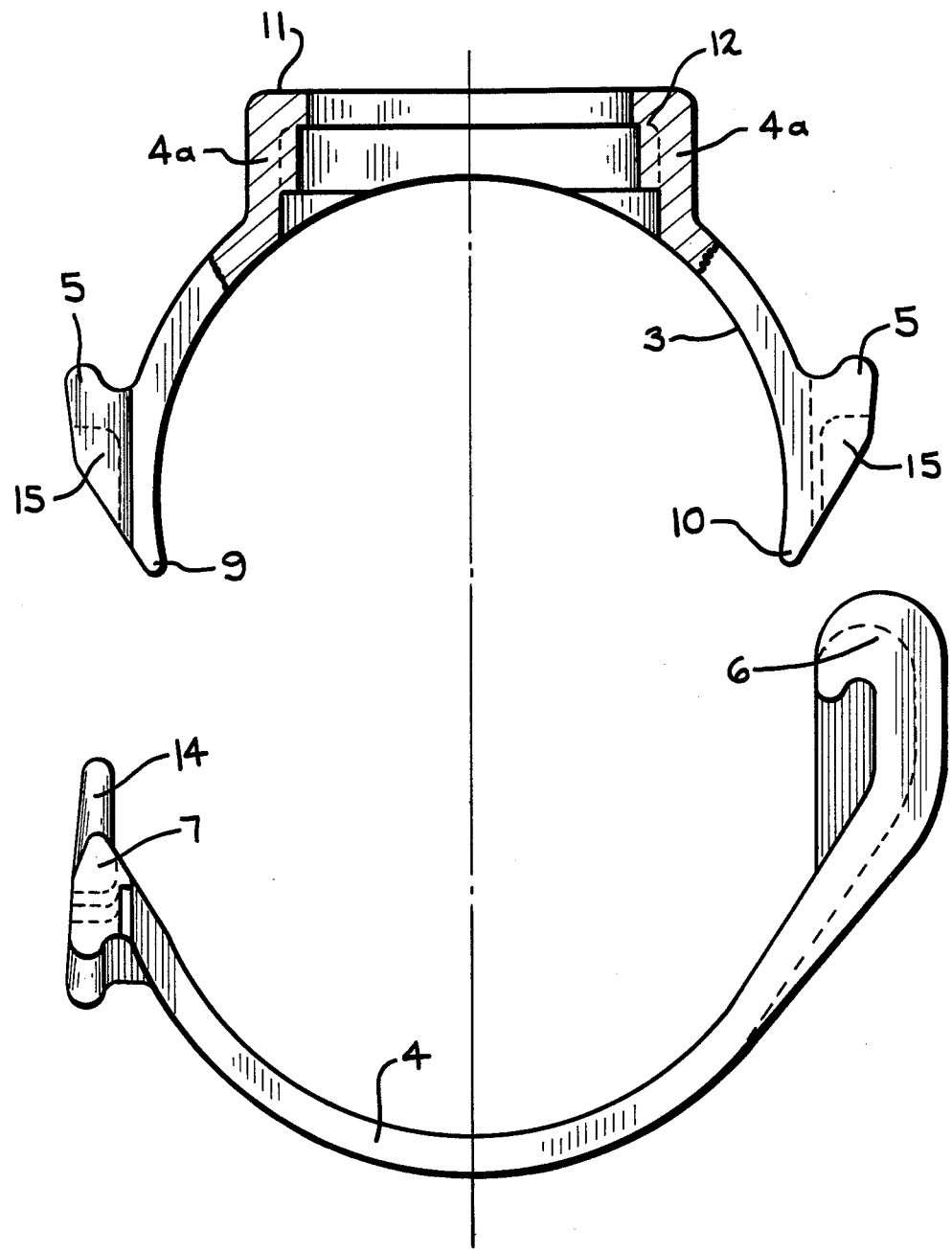
FIG. 2 shows the first and second parts of the branch piece when separated.

In order to avoid tension in the upper and lower saddle members 3, 4, of the branch piece, the connecting member 8 is terminated at one end by an inwardly-bent over endface 13 (FIG. 3) serving as an abutment member. In order to prevent the connecting member from sliding back, the lower saddle member 4 is provided with a lip or step cam 16 behind which is disposed an extension 13a of endface 13. In order to prevent the upper saddle member from shifting with respect to the lower saddle member, the latter is provided, at the location of the ledge 7, with an abutment 14 adapted to engage with a recess 15 of the upper saddle member.

According to a preferred feature of the invention, the inner circumferential extent of the upper saddle member 3, which is limited by end parts 9 and 10, is greater than 180°, so that when the upper saddle member 3 is disposed on the pipe the upper saddle member can clampingly embrace the pipe and remain in position.

The operation of mounting the branch piece on the pipe proceeds as follows: The upper saddle member 3 is slid over the pipe line 1, the end parts 9 and 10 cooperating slightly resiliently with the outer side of the pipe 1. The coupling edge 6 of the lower saddle member 4 is then caused to engage with one of the coupling edges 5. The hands of the operator are then free to take the connecting member 8, to press the lower saddle member 4 upwardly in the direction of the other coupling edge 5, and to slide the connecting member 8 over the obliquely extending ledge 7 and over the still free coupling edge 5.

The present invention is advantageous in that by clamping the upper saddle member on the pipe both hands of the operator are free, while, on the other hand, the lower saddle member can be disposed either way round on the pipe so that the most favorable position for the mounting of the connecting member 8 can be chosen. Furthermore, since only one connecting member 8 is employed, where there is access to the pipe on one side only, the operation of disposing a second connecting member behind the pipeline, which could only be performed with difficulty, can be omitted.

The branch piece shown in FIG. 1 further comprises an internally threaded tubular insert 12 associated with the branch pipe connection part 4a. The connection part 4a is provided with an inwardly bent over edge 11, and the insert 12 is provided with an outwardly bent over edge which has an outer diameter larger than the inner diameter of the bent over edge 11 so that the insert 12 is retained in position. Interchangeable inserts 12 may be provided with different internal diameters and threads so that threaded pipe ends of different diameter can be connected to the branch piece, and a sealing ring 17 may also be provided. The inserts preferably have an outer diameter such that they fit against the inner wall of the branch connection part 4a.

The feature of a removable threaded insert is desirable because such a branch piece can be more easily manufactured than those of known construction, for which a long cooling time is required to avoid distortion of the branch connection part 4a which is caused by the fact that the core of the thread is not capable of cooling evenly. Since the branch connection part 4a of the branch piece is not threaded, quick cooling is possible.

The branch piece, comprising the upper saddle member and the lower saddle member, and the wedge-shaped member is preferably made of synthetic thermoplastic material, e.g. polyvinyl chloride, polyethylene or polybutene, which may be reinforced with glass fibers.

The inserts may likewise consist of thermoplastic materials, but alternative plastics or other materials may be used.

It is evident that, if desired, the inserts 12 may be provided with sealing means in order to avoid leakage.

What I claim is:

1. A branch piece for providing a branch connection in pipelines, comprising:
    a first part (3) having a branch opening in a wall surface;
    a second part (4) which is connectible with said first part (3) so that said first and second parts (3 and 4) together surround a pipeline (1);
    said first part (3) being provided on both sides thereof with coupling ears (5) which extend parallel to each other and to the longitudinal axis of said first part (3);
    said second part (4) being provided with a coupling edge (6) on a first side thereof, and a longitudinally-extending inclined ledge (7) on a second side thereof;
    a wedge-shaped member (8) being provided with an inwardly-bent over endface (13), and which serves as an abutment member;
    said wedge-shaped member (8) contacts at least a portion of said longitudinally-extending inclined ledge (7) and at least a portion of one of said coupling ears (5) to connect together said first and second parts (3 and 4);
    said coupling edge (6) being capable of engaging the other one of said coupling ears (5);
    said second part (4) being provided with a lip 16;
    said inwardly-bent over endface (13) of said wedge-shaped member (8) is provided with an extension (13a); and
    said extension (13a) is disposed behind said lip (16) on said second part (4).

* * * * *